No. 843,984. PATENTED FEB. 12, 1907.
R. S. WOODWARD, Jr.
APPARATUS FOR EXTRACTING COTTON OIL.
APPLICATION FILED JUNE 16, 1906.
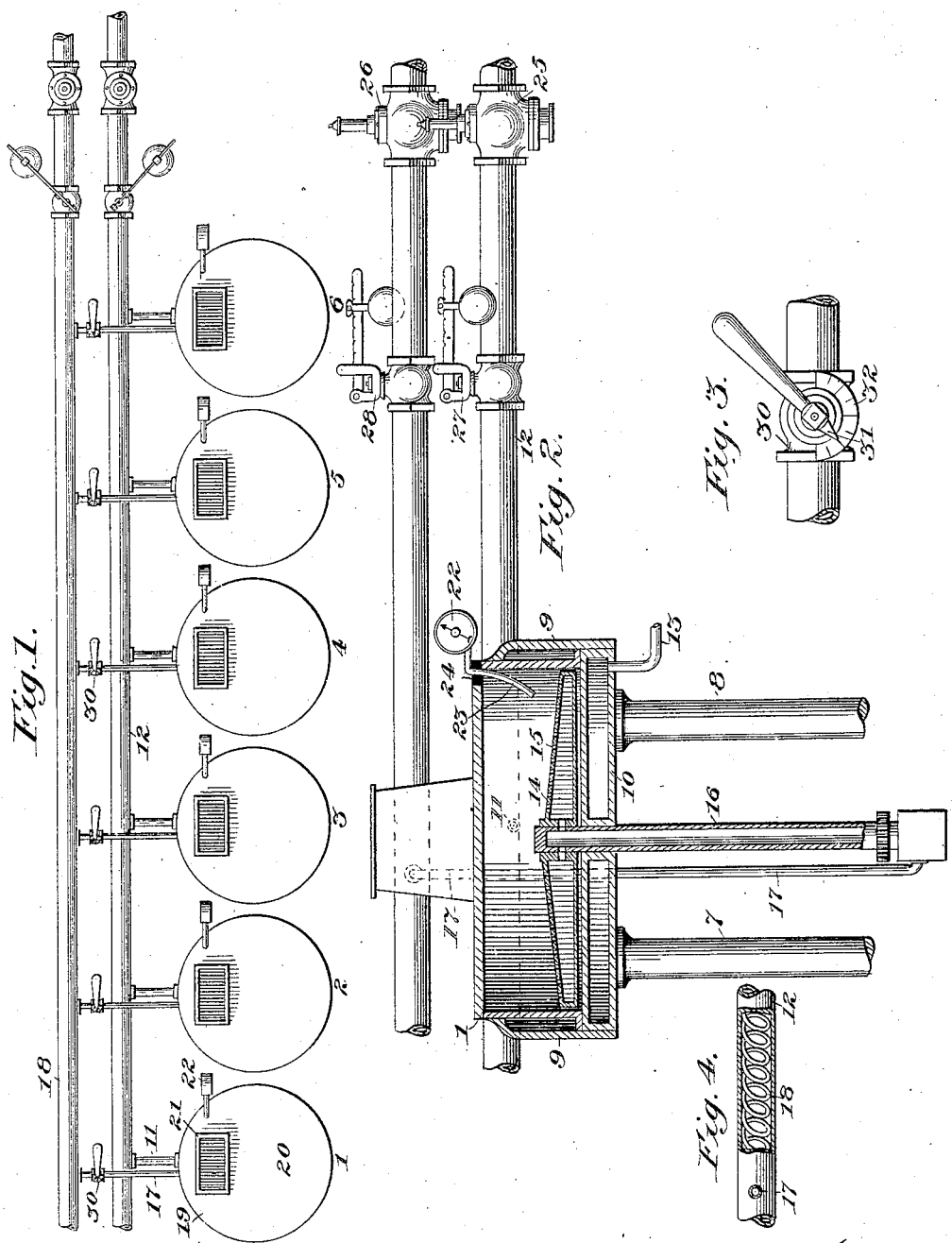

UNITED STATES PATENT OFFICE.

ROBERT S. WOODWARD, JR., OF NEW YORK, N. Y.

APPARATUS FOR EXTRACTING COTTON-OIL.

No. 843,984.  Specification of Letters Patent.  Patented Feb. 12, 1907.

Application filed June 16, 1906. Serial No. 321,986.

*To all whom it may concern:*

Be it known that I, ROBERT S. WOODWARD, Jr., citizen of the United States, residing at New York city, in the county of New York and State of New York, have invented certain new and useful Improvements in Apparatus for Extracting Oil from Oleaginous Seeds, of which the following is a specification.

In the extraction of oil from oleaginous-seed meats, particularly cotton-seed meats, the most important and vital step is that of cooking the meats, and this step alone is the only one of the several involved which may be termed a chemical step, the remaining being entirely mechanical. Upon the proper cooking of the meats is dependent both the quality and quantity of the yield of oil therefrom, and unless due regard is had to what may be considered the three essential elements involved therein, as hereinafter set forth, it becomes impossible to operate upon successive batches of meats in the uniform manner which is essential in order to obtain a maximum yield of oil therefrom, as above noted. Heretofore in the cooking of the meats it has been impossible to even approximate a maximum yield of oil of uniform quality therefrom because of the absence of an economical and scientific method of maintaining the essential elements of the process uniform under the varying conditions encountered in actual operation.

My invention relates to an apparatus for cooking cotton-seed meats according to the process of extracting cotton-oil described in my application of even date herewith, and has for its object the systematic and accurate regulation of the humidity and temperature of the meats during definite periods of time according to a prearranged schedule, as opposed to the inaccurate and irregular control of these elements involved in the cooking of the meats in all apparatus heretofore known. The apparatus in which the said process may be successfully carried out is illustrated in the accompanying drawings, forming a part of this specification, in which—

Figure 1 is a plan view of my apparatus. Fig. 2 is a front sectional elevation of a single heater together with an elevation of the steam-mains and valves thereof. Fig. 3 is a detail plan view of a graduated stop-valve with a fragmentary view of the steam-main. Fig. 4 is a fragmentary detail elevation, partly broken away, of a modification in which the superheated-steam main consists of a steam-coil included within a larger steam-main.

In the drawings the reference-numerals 1, 2, 3, 4, 5, and 6 designate a battery of similar heaters. The heater 1, which is typical of the series, is supported upon standards 7 and 8 and provided with communicating steam-jacketed walls and bottom 9 and 10, which jackets are connected by a pipe 11 with a steam-main 12 and provided with an exhaust-pipe 13. A hollow stirrer 14, the upper surface of which is provided with perforations 15, is mounted upon a rotatable shaft 16, through which it is connected by means of a pipe 17 (connection not shown) to a steam-main 18, whereby an even distribution of moisture throughout the contents of the heater can be accomplished. The top 19 of the heater is provided with a hinged portion 20. A feed-hopper 21 is provided with closure-slides, (not shown,) as is customary in the art.

A thermometer 22 is removably mounted on the top of the heater, and the leg 23 is insulated therefrom by a non-heat-conducting packing 24. The steam-mains 12 and 18 are each provided with reducing-valves 25 and 26 and safety-valves 27 and 28 intermediate the said reducing-valves and the heater. The direct-steam-supply pipe 17 is provided with a graduated stop-valve 30. A pointer 31 is arranged to traverse the face of an opposing dial 32 and is adapted to be locked in any desired position whereby predetermined amounts of steam can be introduced during any given period of cooking.

I have discovered that the so-called "balling" of the meats can be prevented if the direct steam is superheated prior to its introduction and thoroughly disseminated through the mass. This of course may be accomplished either by providing a separate superheated-steam main corresponding in size to the direct-steam main 12 or by a relatively small steam-main consisting of a steam-coil within the main 12, into which steam under reduced pressure relative to the steam-pressure of the main 12 is conducted.

The form of graduated stop-cock which I preferably use is the type now extensively used in gas-engines to throttle the supply of gas to the mixing-chamber.

The exact regulation of the pressure of the steam supplied from main 17 as direct steam and also to the jackets 9 and 10 from the main 12 is accomplished by means of the reducing-valves 25 and 26, which maintain the supply of the steam at definite pressures. Preferably also I provide safety-valves as additional security against irregular pressures of the steam supplied to the graduated stop-valves and to the jackets of the heater, respectively.

By the adoption of the above means for regulating the supply of pressure of the steam it becomes possible, as hereafter described, to utilize the thermometer as an indicator of any variations in the original moisture content of the successive batches of fresh meats supplied to the heaters.

The operation known as "cooking the meats" as preferably carried out according to my invention is as follows: The meats in a substantially air-dry condition are first introduced into the heater and the cover placed thereon. The operator or cook then sets the various controls according to the prearranged schedule. For example, the graduated stop-valve must be set to supply during the cooking period, which is an arbitrary period usually between seventeen and twenty-five minutes, an amount of moisture equal to the difference between the desired moisture content of the meats at the termination of the cooking period and the original moisture content thereof. The temperature of the steam supplied to the jackets is preferably that of steam at forty pounds pressure, although various degrees of temperature may be used, provided the particular one chosen is maintained constant. The stop-valve is empirically graduated and preferably it is in degrees which directly indicate in percentages an amount of steam supplied during the period equal to the difference between the desired moisture content at the termination of the cooking period and the water content of the fresh meats. The controls being set, as indicated above, and the cooking period having been commenced, the points of the thermometer will gradually soar from 60° until it reaches a certain maximum of about 215° Fahrenheit, and this movement will occupy a given time provided the conditions remain the same. If, however, a subsequent batch of fresh meats whose moisture content is unknown has a greater moisture content than the batch having a known moisture content and according to which the controls were set, the pointer of the thermometer will lag and fail to reach the maximum temperature in the same period of time as required for the former batch. This, of course, is because there is an additional amount of moisture in the vessel due to the increase in the water content of the meats introduced, and therefore the addition of an increased number of units of indirect heat units would be required in order to attain the temperature of 215° Fahrenheit in the same period of time. Since the temperature of the jacket is maintained constant, any irregularity in the action of the pointer directly indicates a variation in the moisture content of the fresh batch of meats from that of a previous batch, and thereupon an analysis of the fresh meats is then made prior to the next cooking operation and the controls adjusted accordingly. Preferably the temperature of the jacket is such that the pointer will attain the maximum point—for example, 215° Fahrenheit—coincidently with the termination of the cooking period, as otherwise it is necessary to tabulate the period which elapses during the movement of the pointer from the minimum to the maximum temperatures in order that a variation in the period when operating on a successive batch of meats can be determined. In the absence of fluctuations in the movement of the pointer of the thermometer in the treatment of these successive batches of fresh meats the controls are undisturbed, and in view of the fact that an average analysis requires at least one-half hour, whereas a period of cooking seldom exceeds twenty-five minutes, the importance of an apparatus for controlling the various elements involved in the cooking so that the temperature accurately indicates the fluctuations in the moisture content of successive batches is apparent.

The term "batch of meats" as used throughout the specification and claims relates to a fixed amount of meats.

Having thus described my invention, what I claim is—

1. The combination of a battery of jacketed heaters, two steam-mains, independent connections between one main and the jacket of each heater, means provided with graduated stop-valves adapted to admit known amounts of steam during definite periods, independently connecting the interior of each heater with the other main, and a reducing-valve on each main, adapted to maintain the steam supplied to said heaters at an even pressure, substantially as described.

2. The combination of a battery of jacketed heaters, two steam-mains, independent connections between one main and the jacket of each heater, means, provided with graduated stop-valves adapted to admit known amounts of steam during definite periods, independently connecting the interior of each heater with the other main, a reducing-valve on each main, adapted to maintain the steam supplied to said heaters at an even pressure, and safety-valves on each main intermediate the said reducing-valves and the battery of heaters, substantially as described.

In testimony whereof I affix my signature in presence of two witnesses.

ROBERT S. WOODWARD, Jr.

Witnesses:
W. H. SWENARTON,
CHARLES E. WIRZ.